United States Patent [19]
Roscoe et al.

[11] 3,879,693
[45] Apr. 22, 1975

[54] READER INDEPENDENT OF VARIATIONS IN FEED

[75] Inventors: Gerald S. Roscoe; Wayne F. Vlack, both of Endicott, N.Y.

[73] Assignee: International Business Machines Corporation, Armonk, N.Y.

[22] Filed: Apr. 12, 1974

[21] Appl. No.: 460,322

[52] U.S. Cl. .................. 235/61.11 R; 235/61.11 E
[51] Int. Cl. .............................................. G06k 7/10
[58] Field of Search ............. 235/61.11 R, 61.11 E; 250/555, 566

[56] References Cited

UNITED STATES PATENTS

| | | | |
|---|---|---|---|
| 3,474,232 | 10/1969 | Hearn et al. | 235/61.11 E |
| 3,720,809 | 3/1973 | Pot | 235/61.11 E |

OTHER PUBLICATIONS

Hobbs & Miller, Hand Fed Card Reader, IBM Tech. Disclosure Bulletin, Vol. 15, No. 10, March 1973, pp. 3156–3159.

*Primary Examiner*—Daryl W. Cook
*Attorney, Agent, or Firm*—Norman R. Bardales

[57] ABSTRACT

A carrier carries an information storage medium in operative relationship with the readout means of an information storage medium reader system. The carrier has indicia indicative of the direction of movement of the carrier. The indicia are also in a predetermined spatial correlated relationship with the spatial positions on the storage medium at which the information is stored. The indicia are detected by detection means which provides output signals in response to the indicia. Control circuit means in response to the output signals passes the information signals from the readout means, which are read out from the data stored in the spatial positions, to output means in sequence as the carrier means is fed in a forward direction and prevents the passage of the information signals from the readout means to the output means whenever the carrier means temporarily reverses direction and until the carrier means resumes being fed in the forward direction and the indicia associated with the next data position not previously read out is detected by the detection means.

14 Claims, 4 Drawing Figures

| N | N + 1 | N + 2 |
|---|---|---|
| 1, 4, 7<br>10,......<br>... 76, 79 | 2, 5, 8<br>11,......<br>...77, 80 | 3, 6, 9<br>12,......<br>....78, 81 |

TABLE I

FIG. 2

| DECODE FUNCTION READ OUT | | LOGIC GATE | CARRIER DIRECTION | LOGIC OUTPUT | | |
|---|---|---|---|---|---|---|
| PREVIOUS | NEXT | | | +1 | -1 | EQ |
| N | N + 1 | AND 23 | A | 1 | 0 | 0 |
| N + 1 | N + 2 | AND 25 | A | 1 | 0 | 0 |
| N + 2 | N | AND 24 | A | 1 | 0 | 0 |
| N | N + 2 | AND 26 | $\overline{A}$ | 0 | 1 | 0 |
| N + 2 | N + 1 | AND 27 | $\overline{A}$ | 0 | 1 | 0 |
| N + 1 | N | AND 28 | $\overline{A}$ | 0 | 1 | 0 |
| N | N | AND 20 | A OR $\overline{A}$ | 0 | 0 | 1 |
| N + 1 | N + 1 | AND 22 | A OR $\overline{A}$ | 0 | 0 | 1 |
| N + 2 | N + 2 | AND 21 | A OR $\overline{A}$ | 0 | 0 | 1 |

TABLE II

FIG. 3

READER INDEPENDENT OF VARIATIONS IN FEED

BACKGROUND OF THE INVENTION

1. Field of the Invention

This invention is related to reader systems subject to variations in feed and is particularly useful for manually-fed information storage medium reader systems and the like.

2. Description of the Prior Art

Storage medium readers are used in such applications as punched data card readers, badge readers, etc. Such systems are subject to ambiguities and errors due to feed speed variations and/or erratic feeding motions.

SUMMARY OF THE INVENTION

It is an object of this invention to mitigate ambiguities and errors from readout means associated with storage medium readers due to feed speed variations and/or erratic feeding motions.

It is another object of this invention to mitigate ambiguities and errors from readout means associated with storage medium readers due to the reversing of the medium feeding direction.

Another object of this invention is to mitigate ambiguities and errors from readout means associated with storage medium readers whenever there is a temporary reversal of the medium's direction and thereafter a resumption of the feeding of the medium in the forward, i.e. feed, direction.

According to one aspect of the invention in an information storage medium reader system having output means and readout means for reading information stored in the medium in predetermined plural spatial positions and providing information signals indicative thereof, there is provided a carrier means for carrying the storage medium in operative relationship with the readout means. The carrier means has indicia indicative of the direction of movement of the carrier. The indicia are in a predetermined spatial correlated relationship with the plural spatial positions of the storage medium. Detection means detect the indicia and in response provide output signals. Control circuit means responsive to the output signals passes the information signals from the readout means to the output means in sequence as the carrier means is fed in a forward direction and prevents the passage of the information signals from the readout means to the output means whenever the carrier means temporarily reverses direction and until the carrier means resumes being fed in the forward direction and the indicia associated with the next data position not previously read out is detected by the detection means.

The foregoing and other objects, features and advantages of the invention will be apparent from the following more particular description of the preferred embodiment of the invention as illustrated in the accompanying drawing.

BRIEF DESCRIPTION OF THE DRAWING

FIGS. 2 and 3 are tables useful in explaining the operation of the embodiment of FIG. 1.

In the figures, like elements are designated with similar reference numbers.

DESCRIPTION OF THE PREFERRED EMBODIMENT

Figure 1:
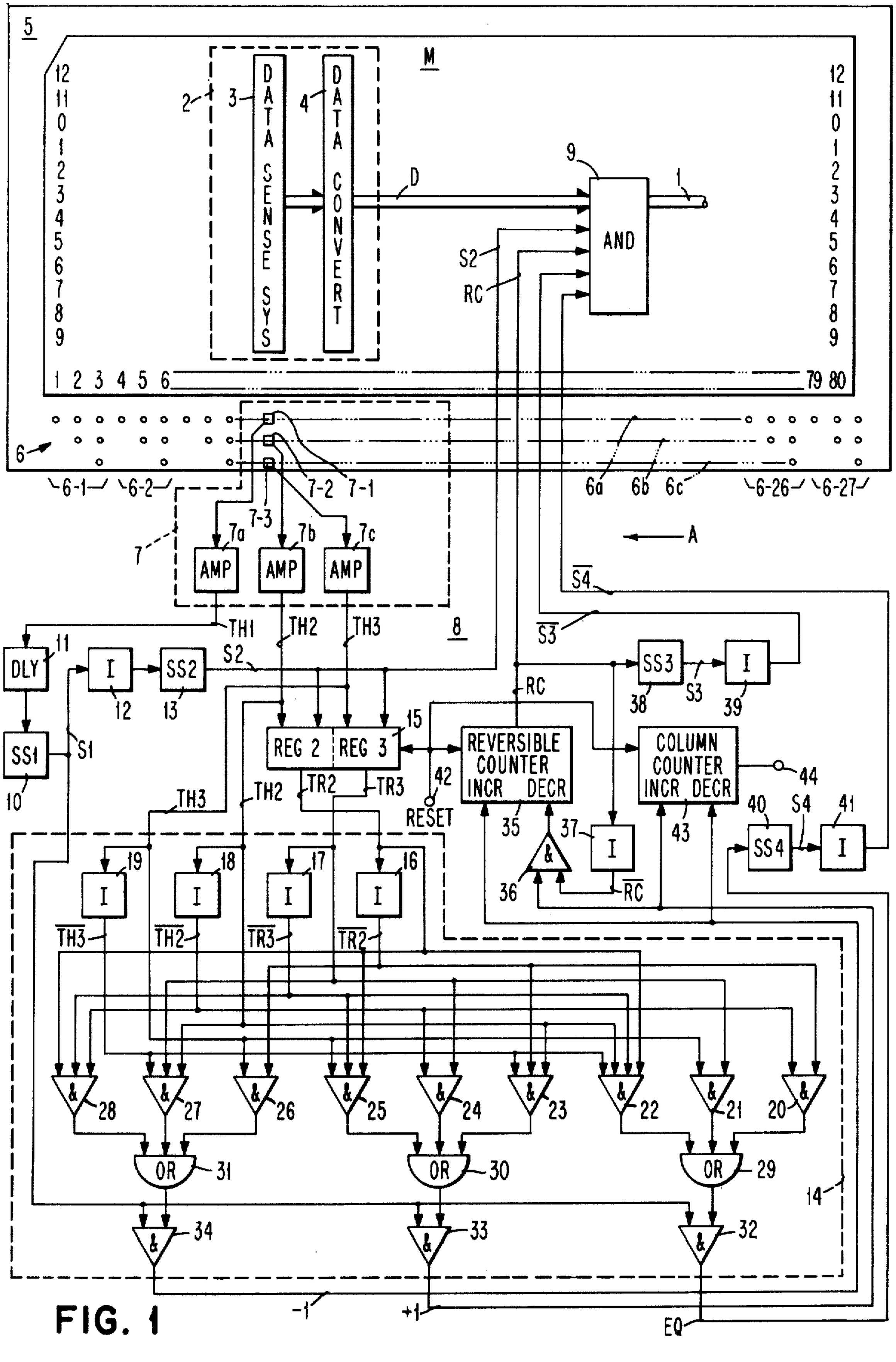
FIG. 1 is a schematic view, shown partially in block form, of a preferred embodiment of the present invention.

In the preferred embodiment of the present invention shown in FIG. 1, the reader system is of the manually-fed type and the storage medium M is of the punched data card type. As such, the medium M has plural spatial positions for storing the information which includes, for example, in one conventional type card eighty vertical columns. The information is stored as punched holes in each column in one or more of twelve possible data bit positions referred to as horizontal rows or simply rows. For example, in one convention a hole represents a binary one and the absence of a hole a binary zero. For sake of clarity, the punched holes are omitted in the illustrated card M.

Referring now to FIG. 1 in greater detail, there is partially shown a storage medium reader system having output means 1 which may, for example, be a data bus. The card M is preferably read out serially i.e., column by column, via schematically shown readout means 2. The card M is manually fed by an operator in the direction indicated by the arrow A in operative relationship with the readout means 2. Readout means 2 includes a sensor system 3 with compatible sensors for detecting the absence and presence of a punched hole, and hence the information data, in each of the twelve bit positions. Preferably, the sensors are a vertical array of photocells. The sensor output of system 3 in turn is converted by converter 4 to an appropriate binary code.

In accordance with the principles of the present invention, in the reader system there is provided a manually-operated carrier means 5. Carrier means 5 carries the information storage medium M in operative relationship with readout means 2 and more particularly, the sensors 3 thereof. Carrier means 5 in FIG. 1 is shown as a flat, plate-like member which supports the punched data card M. Carrier means 5 has indicia 6 which is indicative of the direction of its movement and hence, the direction of movement of the card M. Indicia 6 are also in a predetermined spatial correlated relationship with the aforementioned information associated spatial positions of the card. More specifically, for the aforementioned column-by-column readout, indicia 6 are correlated with the columns of card M. For this purpose, appropriate registration means such as, for example, mechanical stops, not shown, may be provided which maintains the columns of the card M in registration with the indicia 6. For sake of clarity, the feed mechanism associated with moving the carrier means 5 in the forward and reverse directions A, $\bar{A}$ is omitted in the drawing.

Preferably, the carrier means 5 and storage medium are separable members. This allows the present invention to be utilized with standard size recording mediums. It also simplifies the registration of the more flexible card M with the associated readout means. Since the carrier member 5 can be more rigid, it and hence, the card M it carries, can be placed in a more reliable registration with the readout means 2 through suitable feed guide means and the like. However, it should be understood, that on the other hand, if desired, the storage medium M and carrier means 5 may be integral members, in which case the storage medium, for example, would include the indicia 6 along its bottom edge.

Indicia 6 are preferably of the same type as that used for storing the information bits in the recording medium M. This allows the use of compatible sensors and circuitry for both the information data bits and the indicia 6. Thus, indicia 6 for the case of a punched hole data card are also provided as the presence or absence of holes in the manner 5. The indicia 6 are encoded in a simple direction sequence code or pattern which preferably comprises a repetitive sequence of three vertical columns having one, two, and three holes, respectively.

Each vertical column of indicia 6 is correlated with an exclusive one of the data columns of card M. Thus, the first data column of card M is aligned with the first column of indicia 6 which contains one hole; the second column of card M is aligned with the second column of indicia 6 which contains two holes; the third column of card M is aligned with the third column of indicia 6 which contains three holes. The last mentioned three columns of indicia form the first sequence designated by the reference character 6–1. Similarly, the fourth, fifth and sixth data columns of card M are aligned with the fourth, fifth and sixth columns, respectively, of the next sequence 6–2 of indicia 6. For the eighty column card example, there are provided twenty-seven such sequences 6–1 to 6–27. It should be noted that the eightieth data column of the card M is aligned with the prnultimate column of the indicia 6 which also corresponds to the penultimate column of the sequence 6–27. The last, i.e., eighty-first, column of indicia 6 of the sequence 6–27 has no corresponding column position on the card M.

As shown in FIG. 1, the indicia pattern provides a 1 bit, i.e., a hole, in the top row 6*a* of indicia 6 at each column position. There is, however, no hole in the middle row 6*b* of indicia 6 at the first, fourth, seventh, . . . , seventy-sixth, and seventy-ninth column positions. In the bottom row 6*c* of indicia 6, there is a hole present only at the third, sixth, ninth, . . . , seventy-fifth, seventy-eighth column and eighty-first positions.

Detection means 7 detect the indicia 6. In the example where the indicia 6 uses holes, detection means 7 preferably comprise, for example, a vertical array of photocells 7–1, 7–2, and 7–3 and associated waveshaper amplifiers 7*a*, 7*b*, 7*c*, respectively. Photocells 7–1, 7–2, and 7–3 sense the indicia 6 of rows 6*a*, 6*b*, and 6*c*, respectively.

Control circuit means, generally indicated by reference numeral 8, is responsive to the output signals TH1, TH2, TH3 of detection means 7. Control means 8 controls the passage of the information signals D from readout means 2 to output means 1. The information signals D are derived from the information data stored in the spatial positions of the storage medium M which are read out by means 2 as the carrier means 5 is manually fed. Control signals S2, $\overline{S3}$, $\overline{S4}$ and RC from means 8 generally allows the information signals D to pass to output means 1 via schematically shown AND gate means 9 of control means 8 as the carrier means 5 is being fed in the forward direction, cf. arrow A. However, if the carrier means 5 is temporarily reversed, control means 8 prevents the passage of the information signals D to output means 1 until the carrier means 5 resumes being fed in the forward direction and the indicia 6, which are associated with the next storage medium information data position not previously read out by readout means 2, is detected by detection means 7. The foregoing will become more apparent from the description hereinafter of the control circuit means 8 and its operation.

Continuing with the description of the control means 8, the output of amplifier 7*a* is coupled to the input of a single shot multivibrator 19 via an appropriate delay circuit 11. Single shot 10, when triggered, provides an output signal S1 which is fed to the input of the series-connected inverter 12 and single shot multivibrator 13 and to the decode logic circuit 14. The outputs of amplifiers 7*b* and 7*c* are connected to the data inputs of the respective stages designated REG 2 and REG 3, respectively, of register circuit 15. Stages REG 2 and REG 3 are set by the control signal S2 of single shot multivibrator 13. Each of the stages of register 15 is of the polarity hold type. Such types are reset by the initiation of the set pulse and then set by the set pulse to a binary state corresponding to the binary state of the input signal at its data input. The stages REG 2 and REG 3 are also settable to zero and one states, respectively, by a signal RESET when the card M and carrier means 5 are initially inserted into the system as hereinafter explained. The output signals TR2, TR3 of the stages REG 2 and REG 3 of register 15 and the output signals TH2, TH3 of amplifiers 7*b* and 7*c* are decoded by the decode logic 14 when gated with signal S1.

Preferably, the decode logic circuit 14 includes four inverter circuits 16 – 19 which provide the not couterparts $\overline{TR2}$, $\overline{TR3}$, $\overline{TH2}$ and $\overline{TH3}$ of signals TR2, TR3, TH2, and TH3, which are fed to their respective inputs from stages REG 2, REG 3, and amplifiers 7*b* and 7*c*, respectively. Decoder logic 14 also includes nine AND gates 20 – 28. The outputs of gates 20 – 22 are ORed by OR gate 29. The outputs of gates 23 – 25 are ORed by OR gate 30. OR gate 31 ORs the outputs of gates 26 – 28. AND gate 20 ANDs signals $\overline{TR2}$ and $\overline{TH2}$; AND gate 21 ANDs signals TR3 and TH3; and AND gate 22 ANDs signals TH2, TR2, $\overline{TR3}$ and $\overline{TH3}$. AND gate 23 ANDs signals $\overline{TR2}$, TH2 and $\overline{TH3}$; AND gate 24 ANDs signals TR3 and $\overline{TH2}$; and AND gate 25 ANDs signals TR2, TH3, and $\overline{TR3}$. AND gate 26 ANDs signals $\overline{TR2}$ and TH3; AND gate 27 ANDs signals TH2, TR3, and $\overline{TH3}$; and AND gate 28 ANDs signals $\overline{TH2}$, $\overline{TR3}$ and TR2. AND gates 32, 33 and 34 ANDs the outputs of OR gates 29 – 31 respectively, with the signal S1. The output signals designated EQ, +1 and −1 are provided at the outputs of gates 32 –34, respectively. Thus, signals EQ, +1, −1 are the result of comparing TH2, TH3 with TR2, TR3.

Signal −1 from gate 34 is fed to the increment input of a reversible counter 35. Signal +1 from gate 33 is fed to the input of AND gate 36. The other input of AND gate 36 is connected to the output of an inverter 37, the input of which is coupled to the output of counter 35. The output of AND gate 36 is fed to the decrement input of counter 35. The output of counter 35, which provides output signal RC, is also fed to an input of AND gate 9 and the input of a single shot multivibrator 38. Inverter 39 inverts the output signal S3 of single shot 38 and the output of inverter 39, which provides output signal $\overline{S3}$, is connected to an input of AND gate 9. Signal EQ from gate 32 is fed to another single shot multivibrator 40 which provides an output signal S4. Inverter 41 inverts signal S4 to its not counterpart $\overline{S4}$ which in turn is fed to AND gate 9. AND gate 9 thus ANDs the respective output signals S2, RC, $\overline{S3}$, $\overline{S4}$ with the data signals D from readout means 2. Reset terminal 42 is connected to the reset input of counter 35. The reset terminal 42 is also connected to register 15 so that when a reset pulse is applied to terminal 42, the outputs of REG 2 and REG 3 are both placed at UP levels. If desired, an additional reversible counter 43 is provided which indicates the actual column position being read out and can be used to provide an output signal at its output terminal 44 when the last column is read out. Column counter 43 is controlled by the signals +1, −1 fed to its increment and decrement inputs, respectively, and is reset by the reset signal at terminal 42.

In order to simplify the explanation of the preferred embodiment, there is shown in FIG. 2, a look-up table, referred to as TABLE 1, which categorizes the eighty-one columns of indicia 6 into three general terms, to wit: N, N+1, and N+2. Thus, the identical indicia columns 1, 4, 7 . . . 76, 79 are associated with term N; the identical indicia columns 2, 5, 8 . . . 77, 80 are associated with term N+1; and the identical columns 3, 6, 9 . . . 78, 81 are associated with term N+2. For any particular column, its adjacent upper and lower columns can be obtained from TABLE I. For example, if the particular column is one of the N columns, e.g., the fourth column, its adjacent upper and lower columns are N+1 and N+2 columns, respectively, which are the fifth and third columns, respectively, for the fourth column example.

Referring to FIG. 3, there is shown a truth table, referred to as TABLE II, for decoding the possible input conditions to logic means 14. For example, if the previous indicia column read out is an N column and the next column read out is an N+1 column, then AND gate 23 is activated and the output signal +1, which is provided by gate 33, is at an UP or "1" level. For this input condition, the carrier means 5 is moving in the forward direction A. On the other hand, if the previous indicia column read out is an N column, but the next column read out is an N+2 column, then AND gate 26 is active, thereby providing an UP level in the output of signal −1. Under this last set of conditions the carrier means 5 is moving in the reverse direction $\overline{A}$. Whenever the carrier means 5 is moving in one direction so that a column of indicia 6 is read out and thereafter the carrier means 5 is stopped between two adjacent columns of indicia 6 so that neither is in optical coupling relationship with the sensors of detector 7 and then its direction of motion is reversed so that the previous read out column, e.g., an N column, is again or next read out, then the appropriate one of the AND gates 20, 21, 22 is activated, e.g., gate 20 for the example of reading out an N column twice in succession. Under these conditions, an UP level is provided in the output signal EQ. Whenever the carrier means 5 is moving in one direction and then is stopped while still in optical coupling relationship with a particular column, e.g., an N column, the next column read out when motion is resumed will be either one that is above or below it, e.g., an N+1 or an N+2 column for the N column example, depending upon the direction of movement of the carrier means 5 when the particular next column is read out.

The output of counter 35 includes an AND gate, not shown, which ANDs the complement outputs of the counter's bit stages. Thus, when counter 35 is at a zero count, its output signal RC is at an UP level. Accordingly, if the counter 35 is at the zero count and carrier means 5 is moving in the forward direction A, counter 35 cannot be either incremented or decremented, since there are no pulses in signal −1, which increments counter 35, and the pulses of signal +1, which decrements counter 35, are blocked by AND gate 36 due to the inhibiting DOWN level of the not counterpart signal $\overline{RC}$. When the carrier means 5 moves in the reverse direction $\overline{A}$, there are no pulses in signal +1. However, there are pulses in signal −1 and each such pulse increments counter 35 to the next highest count. Thus, when means 5 resumes motion in the forward direction, its output signal RC is at a DOWN level. Gate 36 is now enabled by the UP level of signal $\overline{RC}$ and consequently each pulses in signal +1 decrements counter 35 to its next lowest count. When the counter 35 resumes its zero count and carrier means 5 continues to move in the forward direction A, AND gate 36 again becomes inhibited and prevents the pulses of signal +1 from decrementing counter 35 as carrier means 5 continues to move in the direction A. Prior to the counter 35 resuming the zero count, the motion of carrier means can be reversed several times since the net effect of the resultant pulses of signals +1 and −1 is to cancel each other out so that once the counter 35 resumes the zero count and carrier means 5 continues in the direction A, counter 35 cannot be decremented and furthermore cannot be incremented unless and/or until the carrier means 5 once again moves in the reverse direction $\overline{A}$.

AND gate means 9, whenever its input signals RC, S2, $\overline{S3}$ and $\overline{S4}$ are at UP levels, passes the data signals D being read out at the time to data bus 1. The respective pulse widths of signals S1, S2, S3, S4 have time durations of T1, T2, T3, T4, respectively, which are substantially equal and of short duration relative to the speed at which the carrier means 5 is moved. A pulse is generated in signal S1 for each indicia column position in response to the detection of the associated indicia 6 in the first row 6a. In response to each pulse of signal S1, a pulse is provided in signal S2 in a consecutive time period. A pulse, when provided, of either signal S3 or S4 is in time coincidence with both the particular pulse of signal S1 with which it is associated and the resultant pulse of signal S2 appearing in the consecutive time period. Signal $\overline{S3}$ goes to a DOWN level whenever the output signal RC of counter 35 goes from a DOWN to an UP level, which occurs when counter 35 goes to a zero count. Counter 35 resumes the zero count when the last data column position previously read out is once again detected. The DOWN level of signal $\overline{S3}$ thus inhibits AND gate means 9 and thereby prevents this data column position from again being read out and thereby avoiding ambiguity or redundancy in the data signals on output bus 1. Similarly, AND gate 9 means is inhibited from passing redundant data signals D by signal $\overline{S4}$ in those situations where the same column position is read out twice in succession which occurs when the carrier means 5 stops between two adjacent columns and reverses its direction as previously explained.

Figure 4:
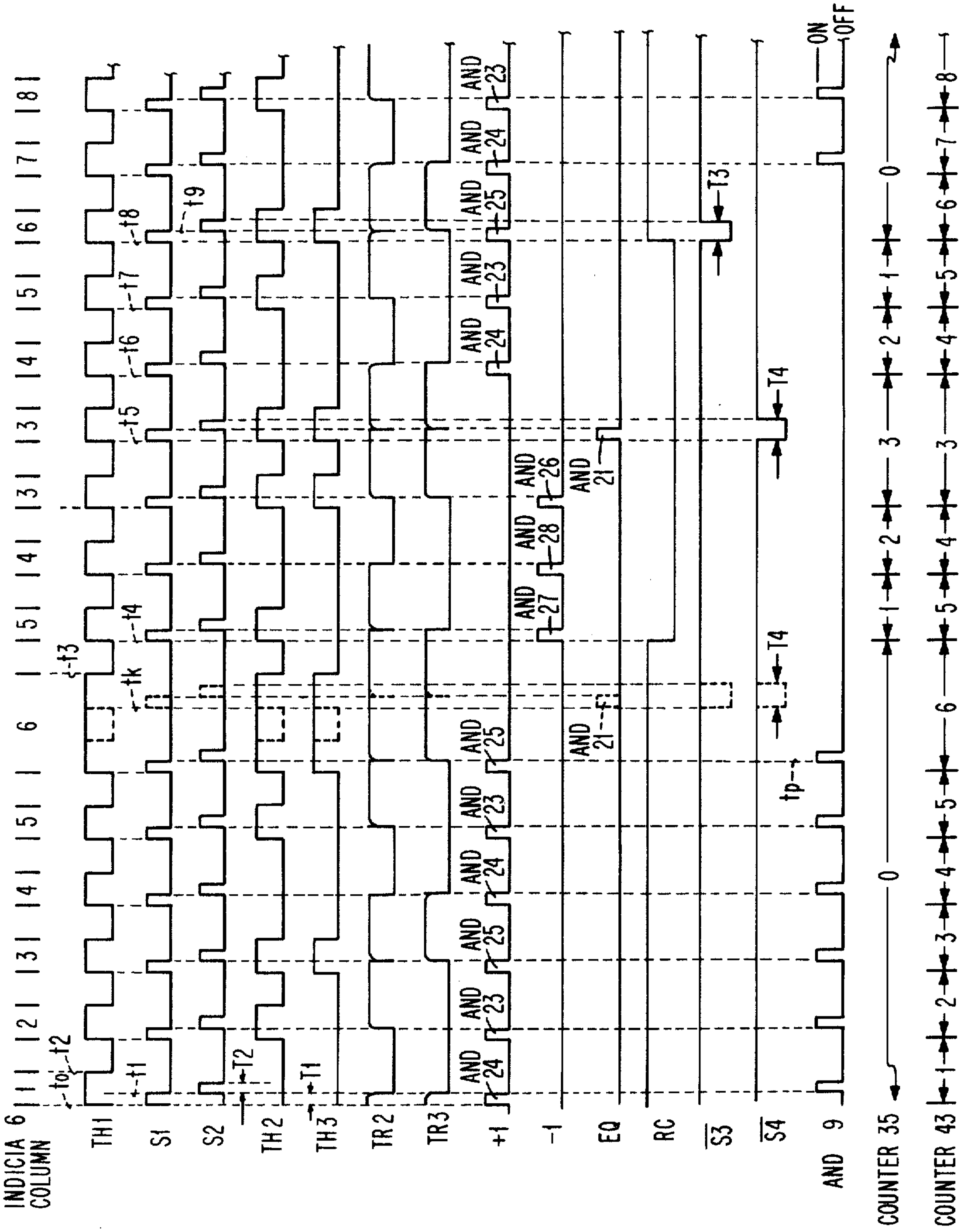
FIG. 4 is an idealized waveform diagram of certain signals of the embodiment of FIG. 1.

The operation of the preferred embodiment of FIG. 1 will next be described by means of a specific assumed example and the idealized waveforms of FIG. 4.

In the specific example, it is assumed that after the card M and carrier means 5 have been inserted into the system, the operator begins to feed the carrier means 5 in the forward direction A. When the carrier means 5 reaches the position where the sixth column of data is read out, the operator then intentionally or unintentionally stops the movement of the carrier means 5 at the sixth column position, i.e., with detector 7 still in optical coupling relationship with the indicia 6 of the sixth column position. He next moves the carrier means 5 in the reverse direction $\bar{A}$. He continues the reverse movement and after the third column of data is read out, he again stops the movement of the carrier means 5. However, this time he stops the movement somewhere between the second and third columns such that detector means 7 is in non-optical coupling relationship with the indicia 6 of either the second or third columns. Thereafter, he resumes feeding the carrier means 5 in the forward direction A.

Accordingly, in operation, when carrier means 5 and data storage means M are first inserted into the system, a signal RESET in response thereto sets counters 35 and 43 to their respective zero counts and the outputs of REGS 2 and 3 to UP levels. Thus, prior to time *t*0, cf. FIG. 4, signals TR2, TR3, RC, $\overline{S3}$ and $\overline{S4}$ are at UP levels. As the operator begins to feed the carrier means 5 in the forward direction A, the hole, which is equivalent to a 1 bit, of the indicium 6 associated with the first column and first row 6a is detected at time *t*0 by photocell 7–1 of detection means 7 and hence, only signal TH1 at this time goes to an UP level. The detected 0 bits associated the first column and rows 6*b*, 6*c* of indicia 6 causes signals TH2 and TH3 to remain at their DOWN levels. Because of the small time delay provided by circuit 11, the respective data inputs of REGS 2, 3 are insured to be conditioned at time *t*0 by the DOWN levels of signals TH2 and TH3 prior to the initiation of single shot 10. For sake of clarity, however, the small time delay provided by circuit 11 is omitted in the waveforms of FIG. 4, and the rise in the level of the output signal S1 is shown therein in time coincidence with the rise of the level of signal TH1.

During the duration T1 of the first pulse of signal S1, AND gate 24 ANDs the UP levels of its input signals TR3 and $\overline{TH2}$ and thus when gate 33 is sampled by the first pulse of signal S1, signal +1 goes to an UP level during the corresponding time period T1. For sake of clarity, next to each of the pulses of signals +1, −1, and EQ in the waveforms of FIG. 4, there is indicated the particular one of the AND gates 20–28 from which it is derived. For the reasons previously explained, the resultant pulse in signal +1 does not change the state of counter 35, but does increment counter 43 from a zero to a one count. Signals RC and $\overline{S3}$ thus remain at UP levels. Signal $\overline{S4}$ remains at an UP level since signal EQ remains at a DOWN level.

At time *t*1, signal S1 goes to a DOWN level causing signal S2 to go to an UP level. Since the other input signals $\overline{S3}$, $\overline{S4}$ and RC are at UP levels, AND gate means 9 is enabled during the time period T2 associated with first pulse of signal S2. Gate means 9 thus passes the data signals D derived from the data bits of the first column position of card M during the lastmentioned time period T2.

Also at time *t*1, the pulse of signal S2 is applied to the stages of register 15. At this time REGS 2 and 3 have the DOWN levels of signals TH2 and TH3 applied to their respective inputs. Consequently, at time *t*1 the output signal TR2 of REG 2 and the output signal TR3 of REG 3 go from UP to DOWN levels. Thus, there is stored in REGS 2 and 3 the zero bits of the indicia 6 associated with rows 6*b* and 6*c* of the first column.

At time *t*2, the indicium 6 of the first column is no longer optically coupled to sensor 7–1 and hence, signal TH1 goes to a DOWN level.

As the operator continues to move the carrier means 5 in the direction A, AND gate means 9 continues to pass consecutively the data signals D associated with the succeeding column positions two, three, four, five and six during successive sampling periods T2. As was assumed, the carrier means 5 is next stopped at the sixth column position and its movment reversed. As a result, at time *t*3 the carrier means 5 is moving in the direction $\bar{A}$ and signals TH1 to TH3 go to DOWN levels when the holes of indicia 6 of the sixth column are no longer in optical coupling relationship with the sensors 7–1 to 7–3 of detection means 7.

At time *t*4, as the carrier moves in the reverse direction $\bar{A}$, the indicia 6 associated with the fifth column are detected. Since indicia 6 has holes present only in rows 6*a*, 6*b* in the fifth column position, only signals TH1 and TH2 go to UP levels at time *t*4. Signals TR2 and TR3 from REGS 2 and 3 are also at UP levels at time *t*4, as a result of the 1 bits which were stored therein during the previous readout of the indicia 6 associated with the sixth column. During the sampling period T1 associated with the associated pulse of signal S1 at time *t*4, AND gate 27 ANDs the UP levels of signals TH2, TR3 and $\overline{TH3}$ and, consequently, signal −1 provides an output pulse which increments counter 35 from a zero to a one count. As a result, signal RC goes to a DOWN level at time *t*4 thereby inhibiting AND gate means 9. The lastmentioned output pulse of signal −1 also decrements counter 43 from a six to a five count.

The operator continues to move the carrier means in the reverse direction $\bar{A}$ and as a result the indicia 6 associated with the succeeding fourth and third columns are consecutively detected resulting in the signal −1 providing output pulses derived from AND gates 28 and 26, respectively. Thus, during the periods *t*4 –*t*5, counter 35 will have been incremented three counts and counter 43 decremented to the count of three. During this same period *t*4–*t*5, AND gate means 9 remains inhibited by the DOWN level of signal RC.

Just prior to the *t*5, the movement of carrier means 5 in the reverse direction $\bar{A}$ is stopped between the second and third columns as set forth in the assumed example. Consequently, when the direction of carrier means 5 is reserved in the forward direction A, the indicia 6 of the third column is again detected by detection means 7 resulting in the signals TH1 to TH3 going to UP levels at time *t*5. Under these conditions, AND gate 21 detects the UP levels of signals TR3 and TH3 and during the sampling period T1, which is associated with time *t*5, an output pulse in signal EQ is provided causing the output level of signal S4 to go to a DOWN level for a time period T4. Since there are no pulses in either of the signals −1 or +1, the counters 35 and 43 remain at their respective three counts.

Thereafter, at times *t*6, *t*7, *t*8, pulses of signal +1 derived from the successive enabling of gates 24, 23, 25, successively decrement counter 35 to a zero count as the indicia 6 associated with the fourth, fifth and sixth columns are detected in succession, AND gate 36 being enabled by the UP level of signal $\overline{RC}$. Concurrently, counter 43 is incremented successively to counts of four, five and six.

At time $t$8, counter 35 is placed in a zero count causing signal RC to change from a DOWN to an UP level. In response to this change, signal S3 is triggered providing a pulse of duration T3 which inhibits the AND gate means 9 when the sampling period T2 of the associated pulse of signal S2 is generated at time $t$9. Accordingly, the data associated with the sixth column position of card M, which was previously read out at time $tp$, is prevented from being transferred to the data bus 1 at time $t$9.

Thereafter, as the carrier means 5 continues to move in the forward direction A, each time a succeeding column position, i.e., seventh, eighth, etc., is detected, AND gate means 9 will be enabled in the corresponding sampling period T2. Moreover, counter 43 is incremented by the resultant pulses provided in signal +1 so that its count will be indicative of the actual column count being read out. However, counter 35 remains inactive until or unless the carrier means 5 is moved in the reverse direction $\bar{A}$ for the reasons previously explained.

By way of comparison, there is assumed another case where instead of the carrier means 5 stopping motion in the forward direction A in a position where the indicia 6 of the sixth column are still optically coupled to the detector means 7 and then moved in the reverse direction $\bar{A}$ it stops motion in the forward direction A between the sixth and seventh column positions where the detection means 7 is not optically coupled to the indicia 6 of either of these columns. As shown in outline form in FIG. 4, under these new sets of assumed conditions, at time $tk$ the carrier means 5 is now moving in the reverse direction $\bar{A}$, and hence, the indicia 6 of the sixth column are once again detected. As a result, AND gate 21 causes an output pulse to be produced in signal EQ. In response to this pulse of signal EQ, signal $\overline{S4}$ goes to a DOWN level for a time period $t$4 which inhibits the AND gate means 9 during the associated sampling period T2. Thus, the data D derived from the sixth column position of card M and previously read out and passed to the data bus 1 at time $tp$ is not again passed to the data bus during the sampling time T2 associated with time $tk$.

For sake of simplicity, the waveforms TH1 to TH3 are shown in a symmetrical manner. However, generally these waveforms TH1 and TH3 will be asymmetrical since the carrier means 5 may be erratically moved by the operator. However, the resultant asymmetrical shape of the waveforms TH1 to TH3 does not adversely effect the operation of the system. Thus, the speed or the dwell time spent in optical and non-optical coupling relationships with any paticular column of indicia 6 may vary, such speeds or times being generally much slower than the response times of the system or its circuit components of the associated circuitry of FIG. 1. For example, an operator could stop the carrier means 5 while going in a given direction and thereafter resume moving the carrier means 5 in the same direction without adversely effecting the operation of the reader system.

After the last data column is read out and the data passed to the data bus 1, the card and carrier means are removed from the system. The system can be of the type where to remove the carrier means from the system, it is moved in the direction $\bar{A}$. Under such conditions, no other action is required to inhibit the AND gate means 9 since the system automatically inhibits means 9 when the carrier means moves in the direction $\bar{A}$.

However, if desired, an inhibit signal, which is derived from counter 43 when it reaches the final count and the data is passed, may be used to subsequently and positively inhibit gate means 9.

The system can also be of the type in which the carrier means 5 continues to move in the direction A when it is to be removed from the system. In such cases, the system will also automatically prevent redundant passage of the data. Again, if desired, AND gate means 9 may also be positively inhibited in such cases during the removal of the carrier means 5 and card M by, for example, detecting the final count in counter 43 and generating an inhibit pulse therefrom which positively inhibits gate means 9.

Among the advantages of the present invention is that it allows the read out of every data column position irrespective of whether or not information has been encoded in every data column. This is particularly advantageous when one or more data columns are left blank to separate different data fields as such blank columns are accounted for by the system.

The invention has particular application in sending data between two terminals so that the data is free of ambiguities or redundancies due to reversals in the movement of the carrier means.

As aforementioned, the invention is preferably embodied in a manually-fed reader system. However, as is obvious to those skilled in the art, the invention may be employed in automatic and/or semiautomatic feed systems subject variations in feed, i.e., feed speed and/or direction.

Moreover, while the carrier means is preferably a rigid member, it may also be configured as a flexible support member and as such may be configured as a web, belt or tape and the like.

While the invention has been particularly shown and described with reference to preferred embodiments thereof, it will be understood by those skilled in the art that the foregoing and other changes in form and details may be made therein without departing from the spirit and scope of the invention.

We claim:

1. In an information storage medium reader system having output means and readout means for reading information stored in the medium in predetermined plural spatial positions and providing information signals indicative thereof, the combination comprising:

carrier means for carrying said storage medium in operative relationship with said readout means, said carrier means having indicia thereon indicative of the direction of movement of said carrier, said indicia being in a predetermined spatial correlated relationship with said plural spatial positions of the storage medium being carried by said carrier means, detection means for detecting said indicia and providing output signals in response thereto, and control circuit means responsive to said output signals for passing said information signals from said readout means to said output means in sequence as the carrier means is fed in a forward direction and preventing the passage of said information signals from said readout means to said output means whenever said carrier means temporarily reverses direction and until said carrier means resumes being fed in said forward direction and the indicia associated with the next data position not previously read out by said readout means is detected by said detection means.

2. A reader system according to claim 1 wherein said medium and said carrier means are separable members.

3. A reader system according to claim 2 wherein said medium is a punched hole data card.

4. A reader system according to claim 1 wherein said control circuit comprises:

gating means coupled between said readout means and said output means for passing said information signals thereto.

5. A reader system according to claim 4 wherein said control circuit means further comprises:

sample signal generating means responsive to said output signals for providing a sampling signal, first control signal generating circuit means for generating a first control signal for controlling said gating means, said first control signal generating means being responsive to said sampling signal;

second control signal generating means for generating a second control signal for controlling said gating means, said second control signal generating means being responsive to said output signals, said first control signal, and such sampling signal;

third control signal generating means for generating a third control signal for controlling said gating means, said third control signal generating means being responsive to said second control signal; and fourth control signal generating means for generating a fourth control signal for controlling said gating means, said third control signal generating means being responsive to said sampling signal, said first control signal, and said output signals.

6. A reader system according to claim 5 wherein said sample signal generating means comprises a single shot multivibrator.

7. A reader system according to claim 5 wherein said first control signal generating means comprises a single shot multivibrator.

8. A reader system according to claim 5 wherein said second control signal generating means comprises a reversible counter.

9. A reader system according to claim 5 wherein said third control signal generating means comprises a single shot multivibrator.

10. A reader system according to claim 5 wherein said fourth control signal generating means comprises a single shot multivibrator.

11. An information storage medium reader system having output means and readout means for reading information stored in the medium in predetermined plural spatial positions and providing information signals indicative thereof, the combination comprising:

carrier means for carrying said storage medium in operative relationship with said readout means, said carrier means having indicia thereon indicative of the direction of movement of said carrier, said indicia being in a predetermined spatial correlated relationship with said plural spatial positions of the storage medium being carried by said carrier means, detection means for detecting said indicia and providing predetermined output signals in response thereto, gate means coupled between said readout means and said output means; and means for controlling signal gate means responsive to said output signals for passing said information signals from said readout means to said output means in sequence as the carrier means is fed in a forward direction and preventing the passage of said information signals from said readout means to said output means whenever said carrier means temporarily reverses direction and until said carrier means resumes being fed in said forward direction and the indicia associated with the next data position not previously read out by said readout means is detected by said detection means.

12. An information storage medium reader system according to claim 11 wherein said means for controlling further comprises:

sample signal generator means responsive to said output signals for providing a sample pulse of a predetermined first time duration each time the indicia correlated with each of said plural positions is detected by said detection means, first signal generator means responsive to each of said sample pulses for providing a first control signal pulse of a predetermined second time duration after each of said sample pulses, storage means being set by each of said first control pulses to store therein the output signals associated with the particular one of said plural positions being detected at the time, comparison means for comparing the output signals stored in said storage means with said output signals of said detection means, said comparison means including logic circuitry for decoding each of three conditions, to wit: movement of the carrier in a given direction, movement of the carrier means in the reverse direction and movements of the carrier means which cause the detection means to detect consecutively the indicia associated with the same spatial position, said logic circuitry providing mutually exclusive output control signals for each of said three conditions, and second signal generator means responsive to said mutually exclusive output control signals of each logic circuitry and providing other control signals for said controlling of said gating means in co-action with said first control pulse.

13. An information storage medium reader system according to claim 11 wherein said carrier means is manually operated.

14. A system for reading information stored in an information storage medium in predetermined plural spatial positions, comprising:

readout means for providing information signals indicative of such information, translationally movable carrier means supporting and moving the storage medium translationally in forward and reverse directions relative to said readout means, said carrier means having indicia thereon indicative of its direction of movement, said indicia being in correlated relationship with said plural spatial positions of the storage medium, detection means for providing output signals in response to said indicia, and control circuit means responsive to said output signals for passing said information signals from said readout means to said output means in sequence as the carrier means is fed in the forward direction and inhibiting the passage of said information signals from said readout means to said output means whenever said carrier means is moved in the reverse direction and until said carrier means is subsequently fed in said forward direction to a point where the indicia associated with the next information position on the medium not previously read out by said readout means is detected by said detection means.

* * * * *